US008304535B2

(12) United States Patent
Harmer et al.

(10) Patent No.: US 8,304,535 B2
(45) Date of Patent: *Nov. 6, 2012

(54) SUGAR PRODUCTION BY DECRYSTALLIZATION AND HYDROLYSIS OF POLYSACCHARIDE ENRICHED BIOMASS

(75) Inventors: Mark Andrew Harmer, Landenberg, PA (US); Subramaniam Sabesan, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/621,591

(22) Filed: Nov. 19, 2009

(65) Prior Publication Data

US 2010/0125135 A1 May 20, 2010

Related U.S. Application Data

(60) Provisional application No. 61/116,378, filed on Nov. 20, 2008.

(51) Int. Cl.
*C07H 1/08* (2006.01)
*C13K 1/02* (2006.01)
*C13K 1/04* (2006.01)

(52) U.S. Cl. ............................ 536/128; 127/37; 127/46.1

(58) Field of Classification Search .................. 536/128; 127/37, 44, 46.1, 53, 55
See application file for complete search history.

(56) References Cited

U.S. PATENT DOCUMENTS

| 3,954,497 | A | 5/1976 | Friese |
| 4,058,411 | A | 11/1977 | Bellamy et al. |
| 4,072,538 | A | 2/1978 | Fahn et al. |
| 4,237,110 | A | 12/1980 | Forster et al. |
| 4,645,658 | A | 2/1987 | Gaddy et al. |
| 4,806,475 | A | 2/1989 | Gould |
| 5,188,673 | A | 2/1993 | Clausen et al. |
| 5,417,984 | A | 5/1995 | Banker et al. |
| 5,486,068 | A | 1/1996 | Wilson |
| 5,503,996 | A | 4/1996 | Torget et al. |
| 5,597,714 | A * | 1/1997 | Farone et al. .............. 435/100 |
| 5,674,507 | A | 10/1997 | Banker et al. |
| 5,726,046 | A | 3/1998 | Farone et al. |
| 5,916,780 | A | 6/1999 | Foody et al. |
| 6,090,595 | A | 7/2000 | Foody et al. |
| 6,752,902 | B2 | 6/2004 | Heikkila et al. |
| 7,354,743 | B2 | 4/2008 | Vlasenko et al. |
| 2004/0231060 | A1 | 11/2004 | Burdette et al. |
| 2010/0035318 | A1 | 2/2010 | MeloSantanna et al. |

FOREIGN PATENT DOCUMENTS

| WO | 9640970 A1 | 12/1996 |
| WO | 0202826 A1 | 1/2002 |
| WO | 0237981 A2 | 5/2002 |
| WO | 2007111605 A1 | 10/2007 |
| WO | 2008095098 A2 | 8/2008 |
| WO | 2008134037 A1 | 11/2008 |

OTHER PUBLICATIONS

Borjesson, Johan et al., Enhanced enzymatic conversion of softwood lignocellulose by poly(ethylene glycol) addition, Enzyme and Microbial Technology, 2007, pp. 754-762, vol. 40, Elsevier Inc.
Qiabi, A. et al., Comparative studies of hemicellulose hydrolysis processes: application to various lignocellulosic wastes, Industrial Crops and Products, 1994, pp. 95-102, vol. 3, Elsevier Science B.V.
Brief Description of Electroep's Mild-Pretreatment Process for Cellulosic Biofuels, Oct. 23, 2008, Electrostep, Inc., Corvallis, Oregon.
Al-Ani, F. et al., Effect of Chemical Pretreatments on the Fermentation and Ultimate Digestibility of Bagasse by *Phanerochaete chrysosporium*, Journal of the Science of Food and Agriculture, 1988, pp. 19-28, vol. 42, Society of Chemistry Industry.
Tewari, Harmesh K. et al., Role of Pretreatments on Enzymatic Hydrolysis of Agricultural Residues for Reducing Sugar Production, Journal of Chemical Technology and Biotechnology, 1987, pp. 153-165, vol. 38, No. 38, Society of Chemical Industry.
Akhtar, Muhammad Saleem et al., Saccharification of Lignocellulosic Materials by the Cellulases of *Bacillus subtilis*, International Journal of Agriculture & Biology, 2001, pp. 199-202, vol. 3, No. 2.
Archibald, J. G., The Effect of Sodium Hydroxid on the Composition, Digestibility, and Feeding Value of Grain Hulls and Other Fibrous Material, Journal of Agricultural Research, Feb. 2, 1924, pp. 245-265, vol. 27, No. 5.
Singh, A. et al., Saccharification of cellulosic substrates by *Aspergillus niger* cellulase, World Journal of Microbiology and Biotechnology, 1990, pp. 333-336, vol. 6, Rapid Communications of Oxford Ltd.
Hsu, Wen-Hui et al., A new alkali process for the treatment of agricultural byproducts, Shipin Gongye, 1978, vol. 10, No. 1, Food. Ind. Res. Dev. Inst., Hsinchu, Taiwan (Abstract attached).
Teixeira, Lincoln. C. et al., Alkaline and Peracetic Acid Pretreatments of Biomass for Ethanol Production, Applied Biochemistry and Biotechnology, 1999, pp. 19-34, vol. 77-79, Human Press Inc.
Elshafei, Ali M. et al., The Saccharification of Corn Stover by Cellulase from *Penicillium funiculosum*, Bioresource Technology, 1991, pp. 73-80, vol. 35, Elsevier Science Publishers Ltd.
Kim, Tae Hyun et al., Pretreatment and fractionation of corn stover by ammonia recycle percolation process, Bioresource Technology, 2005, pp. 2007-2013, vol. 96, Elsevier Ltd.

\* cited by examiner

*Primary Examiner* — Shaojia Anna Jiang
*Assistant Examiner* — Jonathan S Lau

(57) ABSTRACT

Sugar solutions are obtained from polysaccharide enriched biomass by contacting biomass with water and at least one nucleophilic base to produce a polysaccharide enriched biomass comprising a solid fraction and a liquid fraction. The solid fraction is separated from the lignin-containing liquid fraction and contacted with an acid solution, the acid solution comprising about 70 weight percent to about 100 weight percent sulfuric acid or an acid mixture comprising phosphoric acid and sulfuric acid, at a temperature and for a reaction time sufficient to produce a decrystallized biomass mixture. Water is added and the diluted biomass mixture is then hydrolyzed to produce a saccharification product comprising sugars.

14 Claims, No Drawings

SUGAR PRODUCTION BY DECRYSTALLIZATION AND HYDROLYSIS OF POLYSACCHARIDE ENRICHED BIOMASS

CROSS-REFERENCE TO RELATED APPLICATIONS

This application claims benefit of Provisional Application No. 61/116,378 filed Nov. 20, 2008. This application hereby incorporates by reference Provisional Application No. 61/116,378 in its entirety.

FIELD OF THE INVENTION

Methods for treating biomass to obtain sugar solutions are provided. Specifically, polysaccharide enriched biomass is obtained by the pretreatment of biomass with at least one nucleophilic base in a manner which retains the glucan/xylan weight of the untreated biomass. Sugar solutions are obtained by decrystallization of the polysaccharide enriched biomass with an acid solution, followed by hydrolysis with the diluted acid solution.

BACKGROUND

Cellulosic and lignocellulosic feedstocks and wastes, such as agricultural residues, wood, forestry wastes, sludge from paper manufacture, and municipal and industrial solid wastes, provide a potentially large renewable feedstock for the production of valuable products such as fuels and other chemicals. Cellulosic and lignocellulosic feedstocks and wastes, composed of carbohydrate polymers comprising cellulose, hemicellulose, and lignin are generally treated by a variety of chemical, mechanical and enzymatic means to release primarily hexose and pentose sugars, which can then be fermented to useful products.

Pretreatment methods are used to make the carbohydrate polymers of cellulosic and lignocellulosic materials more readily available to saccharification enzymes. Standard pretreatment methods have historically utilized primarily strong acids at high temperatures; however due to high energy costs, high equipment costs, high pretreatment catalyst recovery costs and incompatibility with saccharification enzymes, alternative methods are being developed, such as enzymatic pretreatment, or the use of acid or base at milder temperatures where decreased hydrolysis of biomass carbohydrate polymers occurs during pretreatment, requiring improved enzyme systems to saccharify both cellulose and hemicellulose.

Teixeira, L., et al. (Appl. Biochem. and Biotech. (1999) 77-79:19-34) disclosed a series of biomass pretreatments using stoichiometric amounts of sodium hydroxide and ammonium hydroxide, with very low biomass concentration. The ratio of solution to biomass is 14:1.

Elshafei, A. et al. (Bioresource Tech. (1991) 35:73-80) examined the pretreatment of corn stover utilizing NaOH.

Kim, T. and Y. Lee (Bioresource Technology (2005) 96:2007-2013) report the use of high amounts of aqueous ammonia for the pretreatment of corn stover.

Intl. Pat. App. Publ. No. WO2004/081185 discusses methods for hydrolyzing lignocellulose, comprising contacting the lignocellulose with a chemical; the chemical may be a base, such as sodium carbonate or potassium hydroxide, at a pH of about 9 to about 14, under moderate conditions of temperature, pressure and pH.

U.S. Pat. Nos. 5,916,780 and 6,090,595, describe a pretreatment process wherein a specified ratio of arabinoxylan to total nonstarch polysaccharides (AX/NSP) is assessed and used to select the feedstock.

Most pretreatments such as the ones described above either result in a pretreated biomass depleted of lignin and hemicellulose or the partial depletion of hemicellulose with retention of most of the lignin. Therefore a method is needed to selectively remove only lignin without significant loss of either hemicellulose or cellulose from the biomass, as these constitute the source of sugars for fermentation. Methods are also needed to convert the delignified biomass to monosaccharides (sugars) economically and in high yield.

A number of pretreatment methods utilizing phosphoric acid or sulfuric acid have been disclosed. For example, U.S. Pat. No. 4,058,411 discloses a process for decrystallizing cellulose in natural cellulosic material through the use of concentrated $H_3PO_4$, which is extracted and recycled. The $H_3PO_4$ ranges in concentration from 80 weight percent to 85 weight percent.

U.S. Pat. No. 4,645,658 discloses a method of recovering concentrated hydrochloric acid from the product obtained from the acid hydrolysis of a cellulose containing material such as biomass. The method involves contacting such product with an extracting solvent.

U.S. Pat. No. 5,188,673 discloses a single step method of converting lignocellulosic materials to sugars including combining and mixing a low solids content lignocellulosic material with concentrated sulfuric acid. A modified single step method includes dilution of the reaction product with water, followed by continued reaction and subsequent separation of the sulfuric acid and sugar solution.

U.S. Pat. No. 5,486,068 discloses a process for treating wood, wood wastes, paper, and/or other types of polysaccharides (matter composed essentially of cellulose and lignin) with concentrated sulfuric acid (93 to 98.5% $H_2SO_4$), or with concentrated phosphoric acid (75 to 85% $H_3PO_4$), or various mixtures of these acids in their concentrated forms. The product of the process, dry solid compositions of matter, can be used for treating agricultural soils or as a landfill.

U.S. Pat. Nos. 5,417,984 and 5,674,507 disclose a method to prepare low crystallinity cellulose by reacting cellulose materials with 85% or higher weight percentage phosphoric acid under controlled sequenced temperature conditions.

U.S. Pat. No. 5,726,046 discloses a method for producing sugars using concentrated acid hydrolysis of biomass. The cellulose and hemicellulose in the biomass is first decrystallized and then hydrolyzed to produce a hydrolyzate containing both sugars and acid. Use of hydrochloric, hydrofluoric, phosphoric, and sulfuric acids is disclosed.

Intl. Pat. Appl. Pub. No. WO 02/02826 describes a process for production of fermentable sugar from cellulose-containing raw materials which are hydrolyzed with an acid-containing solution, particularly comprising sulfuric acid, whereupon the acid is removed from the mixture with an extraction agent. The method is characterized in that a mixture of a lower alcohol and a lower ketone is used as extraction agent.

Intl. Pat. Appl. Pub. No. WO 2007/111605 describes a process and system for the efficient fractionation of lignocellulosic biomass into cellulose, hemicellulose, sugars, lignin, and acetic acid. One step of the process combines a first solvent with the lignocellulosic biomass; another process step combines a second solvent with the material from the previous step. The first solvent comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, among other chemicals or chemical combinations.

Improved, economical methods for decrystallization of cellulose in biomass are needed. Efficient decrystallization of cellulose in biomass and the ability to provide a higher loading of carbohydrates available for hydrolysis (saccharification) are advantageous for a commercial process for the production of fermentable sugars from a renewable resource biomass. Such advantages can make a process to provide high yields of sugars at high concentrations economically competitive.

SUMMARY

The present invention provides a process to produce a sugar solution from polysaccharide enriched biomass containing both hemicellulose and cellulose. The process of the invention involves a pretreatment step wherein biomass is contacted with water and at least one nucleophilic base, with subsequent change in pH from the range of about 12.5-13.0 to the range of about 9.5-10. During pretreatment the lignin is solubilized and the glucan/xylan weight ratio in the insoluble biomass is largely retained, compared to that for untreated biomass. The solid fraction of the resulting polysaccharide enriched biomass is isolated, then contacted with an acid solution to produce a decrystallized biomass mixture. The acid solution comprises sulfuric acid. The acid solution can further comprise phosphoric acid. The decrystallized biomass mixture is diluted and maintained at a temperature and for a reaction time sufficient to produce a saccharification product comprising sugars.

Accordingly the invention provides a process to produce a sugar solution from polysaccharide enriched biomass, the process comprising:
 a) providing a biomass comprising lignin and having a glucan/xylan weight ratio $G_1/X_1$;
 b) contacting the biomass of (a) with water and at least one nucleophilic base, to form a biomass slurry having a pH of about 12.5 to about 13.0; and
 c) maintaining the biomass slurry under reaction conditions comprising a first temperature and first reaction time such that the slurry attains a pH of about 9.5 to about 10.0, wherein the slurry comprises a lignin containing liquid fraction and a solid fraction comprising a polysaccharide enriched biomass wherein the biomass slurry has a glucan/xylan weight ratio $G_2/X_2$ within about 15% of the value of $G_1/X_1$;
 wherein $G_1$ and $G_2$ are grams of glucan per 100 grams of biomass and of biomass slurry respectively, and $X_1$ and $X_2$ are grams of xylan per 100 grams of biomass and biomass slurry respectively;
 d) contacting the isolated polysaccharide enriched biomass solid fraction with an acid solution at a second temperature and for a second reaction time sufficient to produce a decrystallized biomass mixture, wherein the polysaccharides present in the polysaccharide enriched biomass solid fraction have been substantially decrystallized, and wherein the acid solution;
  i) comprises about 70 weight percent to about 100 weight percent sulfuric acid; or
  ii) comprises an acid mixture comprising phosphoric acid and sulfuric acid, wherein the molar ratio of phosphoric acid to sulfuric acid in the acid mixture is from about 3.39:1 to about 0.21:1;
 e) adding water to the decrystallized biomass mixture to produce a diluted biomass mixture, wherein the amount of water added is from about 20 weight percent to about 200 weight percent based on the weight of the decrystallized biomass mixture; and
 f) maintaining the diluted biomass mixture at a third temperature and for a third reaction time to produce a saccharification product comprising a sugar solution.

DETAILED DESCRIPTION OF THE INVENTION

Where the indefinite article "a" or "an" is used with respect to a statement or description of the presence of a step in a process of this invention, it is to be understood, unless the statement or description explicitly provides to the contrary, that the use of such indefinite article does not limit the presence of the step in the process to one in number.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "invention" or "present invention" as used herein is a non-limiting term and is not intended to refer to any single embodiment of the particular invention but encompasses all possible embodiments as described in the specification and the claims.

As used herein, the term "about" modifying the quantity of an ingredient or reactant of the invention employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value, preferably within 5% of the reported numerical value.

The term "lignocellulosic" refers to a composition comprising both lignin and cellulose. Lignocellulosic material may also comprise hemicellulose.

As used herein, the terms "delignification" refers to any process by which lignin is either partly, mostly or wholly removed from cellulosic materials. Generally, this process is by means of chemical treatment. The residue that remains consists of cellulose, hemicelluloses, and other carbohydrate materials. Any residue having undergone a delignification is described herein as "delignified". As used herein, "lignin" refers generally to a polymer found extensively in the cell walls of all woody plants.

The term "cellulosic" refers to a composition comprising cellulose.

By "dry weight" of biomass is meant the weight of the biomass having all or essentially all water removed. Dry weight is typically measured according to American Society for Testing and Materials (ASTM) Standard E1756-01 (Standard Test Method for Determination of Total Solids in Biomass) or Technical Association of the Pulp and Paper Industry, Inc. (TAPPI) Standard T-412 om-02 (Moisture in Pulp, Paper and Paperboard).

The terms "target chemical" or "target product" will be used interchangeably and refers to a chemical, fuel, or chemical building block produced by fermentation. Product is used in a broad sense and includes molecules such as proteins, including, for example, peptides, enzymes and antibodies. Also contemplated within the definition of target product are ethanol and butanol.

The term "saccharification" refers to the hydrolysis of polysaccharides to their constituent monomers and/or oligomers.

The term "polysaccharide enriched biomass" means biomass that has been subjected to pretreatment prior to saccharification such that the noncarbohydrate component of the biomass is significantly reduced.

As used herein, "readily saccharifiable biomass" means biomass that is carbohydrate-enriched and made more amenable to hydrolysis by cellulolytic or hemi-cellulolytic enzymes for producing monomeric and oligomeric sugars. The terms readily saccharifiable biomass and polysaccharide enriched biomass are interchangeable.

"Carbohydrate-enriched" as used herein refers to the biomass produced by the process treatments described herein. In one embodiment the readily saccharifiable carbohydrate-enriched biomass produced by the processes described herein have a carbohydrate concentration of greater than or equal to about 85% of the biomass carbohydrate as compared to biomass prior to pretreating as described herein while removing 75% or greater of the biomass lignin.

The term "biomass" refers to any cellulosic or lignocellulosic material and includes materials comprising cellulose, and optionally further comprising hemicellulose, lignin, starch, oligosaccharides and/or monosaccharides.

As used herein, the terms "nucleophile" and "nucleophilic base" refer to a Lewis base (as that term is used in the art) that is a reagent that forms a chemical bond to its reaction partner, the electrophile, by donating both bonding electrons. Mose bases are also nucleophiles. (See for example *Organic Chemistry, 7th Edition*, Morrison, Robert Thornton; Boyd, Robert N., (1998) Publisher: (Prentice Hall, Englewood Cliffs, N.J.).

Pretreatment (Delignification)

In the methods described herein, biomass is contacted with water and at least one nucleophilic base to form a biomass slurry having an initial pH of about 12.5 to about 13.0. The biomass has a glucan/xylan weight ratio $G_1/X_1$, where $G_1$ is the grams of glucan per 100 grams of biomass and $X_1$ is the grams of xylan per 100 grams of biomass. Glucan and xylan content of biomass can be determined by methods known in the art.

The source of the biomass is not determinative of the invention and may be from any source and may include any cellulosic or lignocellulosic material further comprising hemicellulose, lignin, starch, oligosaccharides and/or monosaccharides and optionally proteins and/or lipid. Biomass may be derived from a single source, or biomass can comprise a mixture derived from more than one source. For example, biomass could comprise a mixture of corn cobs and corn stover, or a mixture of grass and leaves. Biomass includes, but is not limited to, bioenergy crops, agricultural residues, municipal solid waste, industrial solid waste, sludge from paper manufacture, yard waste, wood and forestry waste or a combination thereof. Examples of biomass include, but are not limited to, corn grain, corn cobs, crop residues such as corn husks, corn stover, grasses, wheat, wheat straw, barley, barley straw, hay, rice straw, switchgrass, waste paper, sugar cane bagasse, sorghum, soy, components obtained from milling of grains, trees, branches, roots, leaves, wood chips, sawdust, shrubs and bushes, vegetables, fruits, flowers, and animal manure or a combination thereof. In one embodiment, biomass that is useful for the invention includes biomass that has a relatively high carbohydrate value, is relatively dense, and/or is relatively easy to collect, transport, store and/or handle. In one embodiment of the invention, biomass that is useful includes corn cobs, corn stover, sawdust, and sugar cane bagasse.

Once processed the biomass slurry is maintained at a temperature and for a reaction time sufficient to produce a polysaccharide enriched biomass having a glucan/xylan weight ratio $G_2/X_2$, where $G_2$ is the grams of glucan per 100 grams of polysaccharide enriched biomass and $X_2$ is the grams of xylan per 100 grams of polysaccharide enriched biomass. In contrast to other pretreatment methods, the polysaccharide enriched biomass is produced without selective loss of xylan, as evidenced by a comparison of the values of the ratios $G_2/X_2$ and $G_1/X_1$. Similarity of the numerical values for the glucan/xylan weight ratios of the treated and the untreated biomass indicate that both glucan and xylan are retained in about the same relative amounts in the polysaccharide enriched biomass as were present in the biomass before pretreatment. In one of the described methods, the value of $G_2/X_2$ is within about 15% of the value of $G_1/X_1$. In another, the value of $G_2/X_2$ is within about 10% of the value of $G_1/X_1$. Avoiding preferential loss of xylan during the pretreatment step provides higher xylose yield after saccharification and contributes to improved sugar yields overall and higher sugar concentrations.

The pretreated biomass is referred to as "polysaccharide enriched biomass" or "carbohydrate-enriched biomass" because the pretreatment described above, and in more detail below, solubilizes the lignin contained in the biomass. The glucan and xylan remain insoluble. Physical separation of the lignin-containing liquid fraction from the solid fraction removes lignin and provides solid polysaccharide enriched biomass.

Delignifying biomass prior to enzymatic hydrolysis (saccharification) is advantageous as lignin can bind non-specifically to saccharification enzymes. Removal of lignin before saccharification enables the use of lower enzyme loadings, which provides cost savings with regard to enzyme usage. Removing lignin before saccharification may also improve saccharification rate, titer, and yield. Furthermore, as lignin can contribute to increased viscosity of biomass and biomass slurry, removal of lignin can provide reduced viscosity of biomass and slurries containing biomass, thereby enabling very high loading, for example, greater than about 20 percent, of the biomass in order to produce a sugar solution.

The biomass may be used directly as obtained from the source, or energy may be applied to the biomass to reduce the size, increase the exposed surface area, and/or increase the availability of cellulose, hemicellulose, and/or oligosaccharides present in the biomass to the nucleophilic base and to saccharification enzymes and/or additive used in the saccharification step. Energy means useful for reducing the size, increasing the exposed surface area, and/or increasing the availability of cellulose, hemicellulose, and/or oligosaccharides present in the biomass include, but are not limited to, milling, crushing, grinding, shredding, chopping, disc refining, ultrasound, and microwave. This application of energy may occur before or during pretreatment, before and during saccharification, or any combination thereof.

In general, it is often required to mill the biomass before and/or after pretreatments in order to reduce the particle size and to produce high surface area and porous particles for effective enzymatic saccharification. In the current invention, we unexpectedly find that this energy intensive milling process can be avoided, as the nucleophilic base treatment under selected conditions results in chemical milling to provide delignified biomass of substantially reduced particle size.

The biomass is contacted with water sufficient to wet the entire biomass and at least one nucleophilic base comprising a water soluble metal hydroxide, such as sodium hydroxide or potassium hydroxide. The water soluble metal hydroxide may be used alone or in combination with a metal carbonate, such as sodium carbonate or potassium carbonate, or an organic hydroxide, such as ammonium or alkyl substituted ammonium hydroxides. The nucleophilic base is combined as an aqueous solution or as a solid with the biomass and water to form biomass slurry having an initial pH of about 12.5 to about 13.0. As the delignification proceeds, some of the base is consumed and the pH of the biomass slurry is reduced to a range of about 9.5 to about 10.0. A sufficient concentration of base should be used such that the pH does not drop lower, which would result in insufficient delignification. The extent of delignification can depend at least in part on the choice of reaction conditions and the type of biomass used. For example, in the case of corn cob, about 8 weight percent of NaOH relative the weight of the corn cob has been found to provide optimum delignification. At least about 70 percent of the lignin in the provided biomass may be delignified in the isolated polysaccharide enriched biomass. At least about 80 percent of the lignin in the provided biomass may be delignified in the isolated polysaccharide enriched biomass. At least about 90 percent of the lignin may be delignified in the isolated polysaccharide enriched biomass.

The amount of water in the biomass slurry may be from about 25 weight percent to about 90 weight percent, for example from about 50 weight percent to about 90 weight percent, or from about 75 weight percent to about 90 weight percent based on the combined weight of the biomass, the water, and the nucleophilic base. The water in the biomass slurry refers to the total water from all sources and includes any water contained in or on the biomass, water contained in an aqueous solution of the nucleophilic base, and water added separately In the methods described herein, the dry weight of biomass in the biomass slurry may be at an initial concentration from about 10 weight percent to about 75 weight percent, or for example from about 10 weight percent to about 50 weight percent, or for example from about 10 weight percent to about 25 weight percent, based on the combined weight of the biomass, the water, and the nucleophilic base. The biomass concentration may be maximized to the extent possible to minimize the volume of the reaction vessel. The high biomass concentration also reduces the total volume of pretreatment material, making the process more economical. From a practical viewpoint, high ratios of the weight of biomass to the weight of the basic solution may be limited by the ability to provide sufficient mixing, or intimate contact, for pretreatment to occur at a practical rate.

The biomass slurry is maintained at a temperature of from about 20° C. to about 110° C., for example from about 80° C. to about 110° C. The contacting of the biomass with water and at least one nucleophilic base is carried out for a period time from about 4 hours to about 30 days, for example from about 4 hours to about 1 day. Longer periods of pretreatment are possible, however a shorter period of time may be preferable for practical, economic reasons. Typically a period of contact may be about 24 hours or less and is determined by the time required for the pH of the biomass slurry to drop from a range of about 12.5 to 13.0 to a range of about 9.5 to 10.0. The delignification of biomass with water and at least one nucleophilic base may be performed at a relatively high temperature for a relatively short period of time, for example at from about 90° C. to about 100° C. for about 24 hours to about 16 hours. Alternatively, the biomass-nucleophilic base contacting process may be performed at a lower temperature for a longer period of time, for example from about 50° C. to about 80° C. for about 140 hours to about 100 hours. Moreover, the biomass-acid contacting process may be performed at room temperature (approximately 22-25° C.) for a period of time up to about 300 hours. Other temperature and time combinations intermediate to these may also be used.

For the contacting of the biomass with water and at least one nucleophilic base, the temperature, reaction time, base concentration, weight percent of total water, the biomass concentration, the biomass type, and the biomass particle size are related; thus these variables may be adjusted as necessary to obtain sufficient delignification rate in a controllable manner and to obtain an optimal product for saccharification to sugars.

The pretreatment may be performed in any suitable vessel, such as a batch reactor a continuous reactor. The suitable vessel may be equipped with a means, such as impellers, for agitating the biomass/acid mixture. Reactor design is discussed in Lin, K.-H., and Van Ness, H. C. (in Perry, R. H. and Chilton, C. H. (eds), Chemical Engineer's Handbook, $5^{th}$ Edition (1973) Chapter 4, McGraw-Hill, NY). The pretreatment may be carried out as a batch process, or as a continuous process. Alternatively, the biomass, water and nucleophilic base may be combined in one vessel, then transferred to another reactor. Also biomass may be pretreated in one vessel, then further processed in another reactor.

In order to obtain sufficient quantities of sugars from biomass, the biomass may be pretreated with water and at least one nucleophilic base either once or several times. Likewise, a saccharification reaction can be performed one or more times. Both pretreatment and saccharification processes may be repeated if desired to obtain higher yields of sugars. To assess performance of the pretreatment and saccharification processes, separately or together, the theoretical yield of sugars derivable from the starting biomass can be determined and compared to the measured yields.

The biomass obtained by the pretreatment method of the invention is readily saccharifiable, for example using the method provided below.

Decrystallization and Hydrolysis (Saccharification)

Following pretreatment of the provided biomass with water and at least one nucleophilic base, the polysaccharide enriched biomass comprises a mixture of nucleophilic base, water, partially degraded biomass, lignin, polysaccharides, and monosaccharides. The mixture comprises a solid (insoluble) fraction and a liquid (soluble) fraction. The solid fraction comprises biomass in which the non-carbohydrate component has been significantly reduced. The liquid fraction is composed of lignin and its fragments as its metal salt, along with the excess base and salts related to the nucleophilic base. Prior to saccharification, at least a portion of the solid fraction of the polysaccharide enriched biomass may be isolated in order to physically separate it from the lignin-containing liquid fraction. Isolation of as much of the solid fraction as possible is advantageous, as this allows higher yield of sugars to be obtained after saccharification. In one embodiment of the present method, the composition of the isolated solid fraction of the polysaccharide enriched biomass, on a dry weight basis, may be greater than about 75% polysaccharide. In one embodiment, the composition of the isolated solid fraction of the polysaccharide enriched biomass, on a dry weight basis, may be greater than about 80% polysaccharide. In another embodiment, the composition of the isolated solid fraction of the polysaccharide enriched biomass, on a dry weight basis, may be greater than about 85% polysaccharide. In another embodiment, the composition on a dry weight basis may be greater than about 90% polysaccharide.

Methods for separating the solid fraction from the liquid fraction include, but are not limited to, decantation, filtration, and centrifugation. Methods of filtration include, for example, belt filtration, vacuum filtration, and pressure filtration. Optionally, at least a portion of the solid fraction may be recycled to the pretreatment reactor. The solid fraction may optionally be washed with an aqueous solvent (e.g., water) to remove adsorbed lignin prior to being recycled to the pretreatment reactor. The solid fraction may then re-subjected to additional treatment with at least one nucleophilic base as described above for pretreatment, followed by saccharification with a saccharification enzyme consortium.

The liquid fraction containing lignin may optionally be used as an energy source, or some of the desirable components contained in it may be isolated for additional uses.

After isolating at least a portion of the delignified, solid fraction of the polysaccharide enriched biomass, the solid fraction is decrystallized by contact with an acid solution and subsequently hydrolyzed in the presence of a diluted acid solution to produce a saccharification product comprising sugars. Efficient decrystallization of cellulose in biomass and the ability to provide a higher loading of carbohydrates available for hydrolysis (saccharification) are advantageous for a commercial process for the production of fermentable sugars from a renewable resource biomass. Such advantages can make a process to provide high yields of sugars at high concentrations economically competitive.

The use of small particles of delignified biomass and careful temperature control during the decrystallization step are improvements which provide higher sugar yields than when larger particles of delignified biomass are used for acid decrystallization without adequate temperature control. Small particles of the polysaccharide enriched biomass solid fraction, for example particles of about 5 microns to about 200 microns in diameter, or for example of about 10 microns to about 100 microns in diameter, are suitable. Particles of these size ranges are obtained from the pretreatment with NaOH, which has been found to chemically mill the biomass. The temperature is controlled to avoid exotherms during the decrystallization step. Without the appropriate size of the polysaccharide-enriched biomass particles, decrystallization is not as effective and lower sugar yields are obtained. Without adequate temperature control during the contacting of the polysaccharide enriched biomass with the sulfuric acid, the biomass chars, temperature exotherms can occur, undesired by-products can be formed, and lower sugar yields are obtained. The rate of contacting the solid fraction of the polysaccharide enriched biomass with the acid solution, the order of addition, and effective mixing can be key variables for controlling the rate of decrystallization and the temperature during decrystallization.

The acid solution which is used to decrystallize the solid fraction of the polysaccharide enriched biomass comprises sulfuric acid. The acid solution comprises about 70 weight percent to about 100 weight percent sulfuric acid, for example about 75 weight percent to about 98 weight percent sulfuric acid. Concentrated sulfuric acid or oleum, as discussed below, can be used to prepare the acid solution comprising sulfuric acid.

The acid solution can further comprise phosphoric acid. In this case, the acid solution comprises an acid mixture comprising phosphoric acid and sulfuric acid. The ratio of phosphoric acid to sulfuric acid in the acid mixture is from about 3.39:1 to about 0.21:1 on a molar basis, for example from about 1.98:1 to about 0.36:1, or for example from about 1.27:1 to about 0.56:1. The ratio of phosphoric acid to sulfuric acid in the acid mixture can be 1:1 on a molar basis.

The ratio of phosphoric acid to sulfuric acid in the acid mixture can also be conveniently expressed as the ratio of the weight of concentrated phosphoric acid solution to the weight of concentrated sulfuric acid solution used to prepare the acid mixture. The ratio by weight of concentrated phosphoric acid solution to the weight of concentrated sulfuric acid solution in the acid mixture is from about 20:80 to about 80:20, for example from about 30:70 to about 70:30, for example from about 40:60 to about 60:40, for example about 50:50. By concentrated phosphoric acid solution is meant a solution containing about 85 wt % phosphoric acid ($H_3PO_4$). By concentrated sulfuric acid solution is meant a solution containing about 98 weight percent sulfuric acid ($H_2SO_4$). The acid mixture can contain water from the concentrated acid solutions. In one embodiment, the acid mixture consists essentially of phosphoric acid, sulfuric acid, and water.

Alternatively, it is possible to use fuming sulfuric acid (oleum) in place of a concentrated sulfuric acid solution, or in combination with a concentrated sulfuric acid solution, to provide the desired amount of sulfuric acid in the acid mixture, or in the acid solution comprising about 70 weight percent to about 100 weight percent sulfuric acid. Similarly, it is possible to use a source of phosphoric acid which is greater than 85 weight percent phosphoric acid, in place of or in combination with a concentrated phosphoric acid solution, to provide the desired amount of phosphoric acid in the acid mixture.

In the present method, the ratio of the weight of biomass to the weight of the acid mixture is from about 1:0.2 to about 1:5, or for example from about 1:0.5 to about 1:3, or for example from about 1:0.5 to about 1:2. The percent of biomass, or biomass concentration, in the combination of biomass and the acid mixture, is kept high to minimize the need for concentration of sugars resulting from saccharification of the decrystallized biomass for use in fermentation. The high biomass concentration also reduces the total volume of pretreatment material, making the process more economical. From a practical viewpoint, high ratios of the weight of biomass to the weight of the acid mixture can be limited by the ability to provide sufficient mixing, or intimate contact, for decrystallization to occur at a practical rate. For example, with high ratios it may be necessary to use an extruder or similar equipment to provide sufficient mixing.

The decrystallization of polysaccharide-enriched biomass with the acid solution is carried out at a temperature of from about 0° C. to about 60° C., for example from about 0° C. to about 30° C., or for example from about 20° C. to about 30° C.

The decrystallization is carried out for a reaction time from about 0.1 hours to about 48 hours. Longer periods of contact are possible, however a shorter period of time may be preferable for practical, economic reasons. Typically a period of contact with the acid solution is from a few minutes, for example about 0.1 hours, to about 24 hours. In one embodiment of the invention, at least about 50% of the cellulose in the provided polysaccharide enriched biomass is decrystallized in the decrystallized biomass mixture. In another embodiment, at least about 70% of the cellulose in the provided polysaccharide enriched biomass is decrystallized. In another embodiment, at least about 90% of the cellulose in the provided biomass is decrystallized.

In one embodiment, the decrystallization of polysaccharide-enriched biomass with an acid solution may be performed at a relatively high temperature for a relatively short period of time, for example at from about 30° C. to about 60° C. for about 1 hour to about 8 hours. In another embodiment, the biomass-acid contacting process may be performed at a lower temperature for a longer period of time, for example from about 20° C. to about 30° C. for about 1 hour to about 48 hours. In still another embodiment, the biomass-acid contacting process may be performed at room temperature (approximately 22-25° C.) for a period of time up to about 36 hours. Other temperature and time combinations intermediate to these may also be used.

In the decrystallization of polysaccharide enriched biomass with sulfuric acid, the temperature, reaction time, weight percent of total water in the contacting of biomass with the acid solution, the biomass concentration, the biomass type, and the biomass particle size are related. Thus these variables may be adjusted as necessary to obtain sufficient decrystallization rate in a controllable manner and to obtain an optimal product for hydrolysis to sugars.

The decrystallization of the polysaccharide-enriched biomass may be performed in any suitable vessel, such as a batch reactor a continuous reactor. The suitable vessel may be equipped with a means, such as impellers, for agitating the biomass/acid mixture. Reactor design is discussed in Lin, K.-H., and Van Ness, H. C. (in Perry, R. H. and Chilton, C. H. (eds), Chemical Engineer's Handbook, $5^{th}$ Edition (1973) Chapter 4, McGraw-Hill, NY). The decrystallization reaction may be carried out as a batch process, or as a continuous process.

In order to obtain sufficient quantities of sugars from biomass, the polysaccharide-enriched biomass may be decrystallized with an acid solution one time or more than one time. Likewise, a saccharification reaction can be performed one or more times. Both decrystallization and saccharification processes may be repeated if desired to obtain higher yields of sugars. To assess performance of the decrystallization and saccharification processes, separately or together, the theoretical yield of sugars derivable from the starting biomass can be determined and compared to measured yields.

After the decrystallization, the decrystallized biomass mixture comprises a mixture of acid, water, partially degraded polysaccharide-enriched biomass, and fermentable sugars. Water is added to the mixture to dilute the acid, and the decrystallized biomass mixture is then hydrolyzed. The amount of water added is sufficient to dilute the acid solution such that the concentration of sulfuric acid in the diluted, decrystallized biomass-acid mixture is about 3 weight percent to about 50 percent by weight.

The saccharification reaction is performed with the diluted acid at a temperature of from about 50° C. to about 100° C., for example from about 60° C. to about 100° C.

The saccharification reaction is carried out for a reaction time of about 1 hour to about 8 hours, for example from about 1 hour to about 3 hours. The time for the reaction will depend on the pH of the diluted decrystallized biomass mixture, the reaction temperature, the substrate used, the amount of substrate used, and the concentration of the acid, higher acid concentrations giving faster reaction times. These variables may be adjusted as necessary to obtain an optimal saccharification product for use in additional processing steps, such as fermentation.

The saccharification reaction may be performed in any suitable vessel, such as a batch reactor a continuous reactor. The suitable vessel may be equipped with a means, such as impellers, for agitating the biomass/acid mixture. Reactor design is discussed in Lin, K.-H., and Van Ness, H. C. (in Perry, R. H. and Chilton, C. H. (eds), Chemical Engineer's Handbook, $5^{th}$ Edition (1973) Chapter 4, McGraw-Hill, NY).

The saccharification can be performed batch-wise or as a continuous process. The saccharification can also be performed in one step, or in a number of steps. For example, different reaction temperatures may be employed, or different pH conditions, during the course of the saccharification reaction.

The degree of solubilization of sugars from biomass following saccharification can be monitored by measuring the release of monosaccharides and oligosaccharides. Methods to measure monosaccharides and oligosaccharides are well known in the art. For example, the concentration of reducing sugars can be determined using the 1,3-dinitrosalicylic (DNS) acid assay (Miller, G. L., Anal. Chem. (1959) 31:426-428). Alternatively, sugars can be measured by HPLC using an appropriate column as described herein in the Experimental Section.

Following saccharification, liquid in the saccharification product may be separated from solids, for example lignin, in a batch or continuous method. Optionally, the liquid may be washed with water. The saccharification mixture may be concentrated by evaporation, for example, to increase the concentration of sugars.

The hydrolysis product comprises sugars, wherein the sugars comprise at least one sugar monomer selected from the group consisting of glucose, arabinose, xylose, mannose, and galactose or a combination thereof.

Fermentation to Target Products:

The readily saccharifiable biomass produced by the present methods may be hydrolyzed by enzymes as described above to produce fermentable sugars which then can be fermented into a target product. "Fermentation" refers to any fermentation process or any process comprising a fermentation step. Target products include, without limitation alcohols (e.g., arabinitol, butanol, ethanol, glycerol, methanol, 1,3-propanediol, sorbitol, and xylitol); organic acids (e.g., acetic acid, acetonic acid, adipic acid, ascorbic acid, citric acid, 2,5-diketo-D-gluconic acid, formic acid, fumaric acid, glucaric acid, gluconic acid, glucuronic acid, glutaric acid, 3-hydroxypropionic acid, itaconic acid, lactic acid, malic acid, malonic acid, oxalic acid, propionic acid, succinic acid, and xylonic acid); ketones (e.g., acetone); amino acids (e.g., aspartic acid, glutamic acid, glycine, lysine, serine, and threonine); gases (e.g., methane, hydrogen ($H_2$), carbon dioxide ($CO_2$), and carbon monoxide (CO)).

Fermentation processes also include processes used in the consumable alcohol industry (e.g., beer and wine), dairy industry (e.g., fermented dairy products), leather industry, and tobacco industry.

Further to the above, the sugars produced from saccharifying the pretreated biomass as described herein may be used to produce in general, organic products, chemicals, fuels, commodity and specialty chemicals such as xylose, acetone, acetate, glycine, lysine, organic acids (e.g., lactic acid), 1,3-propanediol, butanediol, glycerol, ethylene glycol, furfural, polyhydroxyalkanoates, cis, cis-muconic acid, and animal feed (Lynd, L. R., Wyman, C. E., and Gerngross, T. U., Biocommodity Engineering, Biotechnol. Prog., 15: 777-793, 1999; and Philippidis, G. P., Cellulose bioconversion technology, in Handbook on Bioethanol: Production and Utilization, Wyman, C. E., ed., Taylor & Francis, Washington, D.C., 179-212, 1996; and Ryu, D. D. Y., and Mandels, M., Cellulases: biosynthesis and applications, Enz. Microb. Technol., 2: 91-102, 1980).

Potential coproducts may also be produced, such as multiple organic products from fermentable carbohydrate. Lignin-rich residues remaining after pretreatment and fermentation can be converted to lignin-derived chemicals, chemical building blocks or used for power production.

Conventional methods of fermentation and/or saccharification are known in the art including, but not limited to, saccharification, fermentation, separate hydrolysis and fermentation (SHF), simultaneous saccharification and fermentation (SSF), simultaneous saccharification and cofermentation (SSCF), hybrid hydrolysis and fermentation (HHF), and direct microbial conversion (DMC).

SHF uses separate process steps to first enzymatically hydrolyze cellulose to sugars such as glucose and xylose and then ferment the sugars to ethanol. In SSF, the enzymatic hydrolysis of cellulose and the fermentation of glucose to ethanol is combined in one step (Philippidis, G. P., in *Handbook on Bioethanol: Production and Utilization*, Wyman, C. E., ed., Taylor & Francis, Washington, D.C., 179-212, 1996). SSCF includes the cofermentation of multiple sugars (Sheehan, J., and Himmel, M., Bioethanol, Biotechnol. Prog. 15: 817-827, 1999). HHF includes two separate steps carried out in the same reactor but at different temperatures, i.e., high temperature enzymatic saccharification followed by SSF at a lower temperature that the fermentation strain can tolerate. DMC combines all three processes (cellulase production, cellulose hydrolysis, and fermentation) in one step (Lynd, L. R., Weimer, P. J., van Zyl, W. H., and Pretorius, I. S., Microbiol. Mol. Biol. Reviews, 66: 506-577, 2002).

These processes may be used to produce target products from the readily saccharifiable biomass produced by the pretreatment methods described herein.

EXAMPLES

The present invention is further defined in the following examples. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

General Methods

The following materials were used in the examples. All commercial reagents were used as received.

Sulfuric acid, ammonium hydroxide, acetic acid, acetamide, yeast extract, glucose, xylose, sorbitol, MgSO4.7H2O, and phosphoric acid were obtained from Sigma-Aldrich (St. Louis, Mo.).

Corn cob was purchased from Independence Corn By Products (ICBP Cob), Independence, Iowa. The seller stored the cob at 60° C. and milled and sieved the cob to ⅛". The dry mass content of the cob was 92.5%. Another variety of cob referred to as MDO7 cob was obtained from University of Wisconsin Farm, in Madison, Wis. and was milled to assorted sizes.

The following abbreviations are used: "HPLC" is High Performance Liquid Chromatography, "C" is Centigrade, "kPa" is kiloPascal, "m" is meter, "mm" is millimeter, "kW" is kilowatt, "μm" is micrometer, "μl" is microliter, "mL" is milliliter, "L" is liter, "min" is minute, "mM" is millimolar, "cm" is centimeter, "g" is gram(s), "mg" is milligrams, "kg" is kilogram, "wt" is weight, "wt %" means weight percent "h" is hour(s), "temp" or "T" is temperature, "theoret" is theoretical, "pretreat" is pretreatment, "DWB" is dry weight of biomass, "ASME" is the American Society of Mechanical Engineers, "s.s." is stainless steel.

Carbohydrate Analysis of Biomass

A modified version of the NREL LAP procedure "Determination of Structural Carbohydrates and Lignin in Biomass" was used to determine the weight percent glucan and xylan in the biomass. Sample preparation was simplified by drying at 80° C. under vacuum or at 105° C. under ambient pressure overnight. The samples were knife milled to pass through a 20 mesh screen but were not sieved. The dry milled solids were than subjected to the acid hydrolysis procedure at a 50 mg solids scale. The solids were not first extracted with water or ethanol. HPLC analysis of sugars was done on an Aminex HPX-87H column and no analysis of lignin was attempted.

The soluble sugars glucose, cellobiose, and xylose in saccharification liquor were measured by HPLC (Waters Alliance Model, Milford, Mass.) using Bio-Rad HPX-87H column (Bio-Rad Laboratories, Hercules, Calif.) with appropriate guard columns, using 0.01 N aqueous sulfuric acid as the eluant. The sample pH was measured and adjusted to 5-6 with sulfuric acid if necessary. The sample was then passed through a 0.2 μm syringe filter directly into an HPLC vial. The HPLC run conditions were as follows:

Biorad Aminex HPX-87H (for carbohydrates):
  Injection volume: 10-50 μL, dependent on concentration and detector limits
  Mobile phase: 0.01 N aqueous sulfuric acid, 0.2 micron filtered and degassed
  Flow rate: 0.6 mL/minute
  Column temperature: 50° C., guard column temperature<60° C.
  Detector temperature: as close to main column temperature as possible
  Detector: refractive index
  Run time: 15 minute data collection After the run, concentrations in the sample were determined from standard curves for each of the compounds.

General Procedure for Delignification of Corn Cob

Corn cob was suspended in a specified volume of deionized water containing a specified weight of nucleophilic base and then mixed with a mechanical stirrer. The slurry was heated to the desired temperature for a specified time. Following this the reaction mixture was cooled to 50° C., vacuum filtered, and the solid residue was washed with deionized water. The solid residue was dried at room temperature either under ambient condition or laboratory vacuum (20 mm Hg). The dry mass content of the solid residue was determined by weighing a known weight of sample and heating to 99° C. under nitrogen atmosphere until constant weight was achieved.

Example 1

This Example illustrates delignification of corn cob.

Corn cob (MDO7, 2.5 kg, moisture content 10%) was slowly added to a stirred solution of 2% sodium hydroxide solution (10 L). The amount of sodium hydroxide (NaOH) was 8.0 weight percent relative to the weight of corn cob. The initial pH of the solution was 12.3. The mixture was heated to reflux and maintained under reflux for 20 h. The reaction mixture was allowed to cool to 60° C. The reaction pH at this point was 9.80. A portion of the mixture (200 g) was set aside. The remainder of the mixture was transferred to a filter funnel with the aid of additional 1.9 kg water and filtered under laboratory vacuum. The filtrate was kept separately for analysis. The solid residue from the filtration was washed with water (4×5 L) and re-suspended in deionized water (10 L). The pH of the suspension was maintained at 5.0 for 2 hours by one addition of 37% HCl (2.5 mL). The suspension was then filtered. After draining off most of the liquid, the solid was collected and stored at room temperature.

The weight of the solid recovered was 5.31 kg. A portion of the solid was dried at 99° C. under nitrogen atmosphere for 4 h to determine the dry matter content of the cake, which was determined to be 25.9%. Further drying of the cake prior to saccharification was done under atmospheric pressure and at ambient temperature for 4 days.

The glucan and xylan content of the cob before and after delignification was determined by the NREL methods, well established in the art, and were found to be as follows:

Raw cob=39.2 wt % glucan; 28 wt % xylan
Delignified cob=51 wt % glucan, 38 wt % xylan The weight ratio of glucan to xylan in the raw cob was 1.40. The weight ratio of glucan to xylan in the delignified cob was 1.34.

Example 2

This Example illustrates delignification of corn cob by treatment with 5.1, 8.0 and 20.0 wt % sodium hydroxide relative to the weight of the cob.

5.1% Sodium hydroxide treatment (5.1 wt % NaOH relative to weight of cob): Corn cob (ICBP, 100 g, milled to 2 mm) was suspended in 0.85% aqueous sodium hydroxide (200 mL, pH 13.0) and heated to 110° C. for 18 h. When the pH was checked at this time, it was nearly neutral. Another 200 mL of 0.85% aqueous sodium hydroxide and solid sodium hydroxide (1.7 g) were added and the heating was continued with occasional shaking of the flask. After 24 h, the hot solution was filtered and extensively washed with water. Though brown color eluted out with the filtrate, the solid material was brown colored indicating the presence of lignin adsorbed to the material. Also, the corn cob pellets retained their shape without as much chemical milling occurring as seen in pretreatment with higher concentrations of NaOH solution. The residue was suspended in water and the pH of the solution was adjusted to pH 5.0 with 20% aqueous citric acid. The residue was filtered and dried at room temperature under laboratory vacuum for 24 h. Yield of solid was 70.3 g. The sample was determined to have 6% moisture content.

8.0% Sodium hydroxide treatment (8.0 wt % NaOH relative to weight of cob): Corn cob (ICBP, 100 g, milled to 2 mm) was suspended in 2% aqueous sodium hydroxide and heated to 110° C. for 24 h. The solution was filtered hot and the residue washed with water to neutral pH and dried under laboratory vacuum for 48 h. The weight of pale yellow powder was 79.3 g. The moisture content of the solid was 20%.

A portion of the dried solid (42.0 g) was suspended in water (500 mL) and the pH (9.5) was lowered to 5.0 by the addition of 10% aqueous citric acid solution. After 45 min at this pH the suspension was filtered, washed with water and dried under laboratory vacuum. The moisture content of this material was 7%.

20.0% Sodium hydroxide treatment (20.0 wt % NaOH relative to weight of cob): Corn cob (ICBP, 1000 g, milled to 2 mm size) was suspended in 5% aqueous sodium hydroxide (4000 mL) and heated to 110° C. for 16 h. The dark brown liquid was filtered hot and much of the liquid on the solid was drained under laboratory vacuum. The solid residue on the filter was washed with water until no more color eluted out. The solid was dried under laboratory vacuum for 24 hours.

100 gram of the above sample was suspended in water (700 mL) and stirred. The pH of the solution was 11.2. Aqueous citric acid solution (10%) was added to lower the pH to 5.0 and the suspension was stirred for 30 min. The solid was then filtered, washed with water and dried under vacuum at room temperature for 24 hours. After drying, 86.2 g of polysaccharide enriched biomass was obtained. The moisture content of this material was 7.3 wt %.

Glucan/xylan ratios, glucan wt %, xylan wt %, lignin wt %, and the percentage total carbohydrate content before and after sodium hydroxide treatment, as determined by the NREL methods for carbohydrate analysis, are presented in Table 1. The pretreatments with 5.1 and 8.0 weight percent NaOH relative to the weight of the biomass used show delignification of the biomass while maintaining a glucan/xylan weight ratio within 15% of that for the untreated biomass.

TABLE 1

Results for Polysaccharide Enriched Biomass Obtained by NaOH Pretreatments (Example 2).

| Sample | Glucan/Xylan weight Ratio | Glucan (wt %) | Xylan (wt %) | Lignin (wt %) | % Total Carbohydrate in the Biomass |
|---|---|---|---|---|---|
| Untreated corn cob | 1.33 | 37.5 | 28.74 | 13.88 | 66 |
| 5.1% NaOH | 1.33 | 47.8 | 35.8 | ND[1] | 84 |
| 8.0% NaOH | 1.35 | 52.96 | 39.11 | 3.33 | 92 |
| 20% NaOH | 1.84 | 58.55 | 31.86 | 5.43 | 90 |

Note:
[1]ND means "not determined"

Examples 3 through 5 illustrate decrystallization and hydrolysis of delignified corn cob with sulfuric acid or a mixture of phosphoric acid and sulfuric acid. The delignified corn cob was dried in an oven at 80° C. under a nitrogen flow overnight prior to its use; particle size was generally in the range of about 10 microns to about 100 microns in diameter. The particle size was estimated using scanning electron microscopy (Hitachi S2100).

Example 3

In a glass vial, 0.5 g of delignified corn cob (delignified using 8 weight percent sodium hydroxide based upon the weight of corn cob, as in Example 2) was mixed with 1 g of 98% sulfuric acid in a glass vial (Aldrich Chemical Company). The mixture was mixed with a spatula for fifteen minutes. 15 g of water was then added and the vial and contents were heated using an oil bath set to 115° C. The vial was connected to a reflux condenser. 0.2 g samples were taken at specific times and analyzed using HPLC. For the analysis, typically 0.2 g of sample was added to 4 g of water to which 1 g of an ion exchange resin (Amberlyst A-21, Aldrich, St. Louis, Mo.) was added. The sample was stirred for at least one hour, filtered, and then analyzed via HPLC. The yields of glucose and xylose (based upon known xylan and glucan levels in the corn cob) are presented in Table 2. At the end of the hydrolysis reaction, the glucose yield was 99-100% of theoretical.

TABLE 2

Yields to Glucose and Xylose (Example 3).

| Time (minutes) | % Yield to Glucose | % Yield to Xylose |
|---|---|---|
| 15 | 9.4 | 20.68 |
| 30 | 25.8 | 40.38 |
| 45 | 41.3 | 51.96 |
| 60 | 55.3 | 59.61 |
| 90 | 71.4 | 64.19 |
| 120 | 83.3 | 69.63 |
| 180 | 92.4 | 73.52 |
| 240 | 98.1 | 76.65 |

Example 4

The general procedure of Example 3 was followed using 0.32 g of delignified corn cob (delignified using 8 weight percent sodium hydroxide based upon the weight of corn cob, as in Example 2) and 0.74 g of 98% sulfuric acid. The mixture was left stirring for 15 minutes, then 9 g of water was added and the mixture stirred and heated at 130° C. for 2 hours. Results are shown in the following Table.

TABLE 3

Yields to Glucose and Xylose (Example 4).

| Time (minutes) | % Yield to Glucose | % Yield to Xylose |
|---|---|---|
| 15 | 6.5 | 21.0 |
| 30 | 21.4 | 47.3 |
| 45 | 43.9 | 65.1 |
| 60 | 61.0 | 73.4 |
| 90 | 85.3 | 85.4 |

Example 5

The general procedure of Example 3 was followed using 0.5 g of delignified corn cob (delignified using 8 weight percent sodium hydroxide based upon the weight of corn cob, as in Example 2) and 1.0 g of 98% sulfuric acid. The mixture was left stirring for 30 minutes, then 15 g of water was added and the mixture stirred and heated at 120° C. for 4 hours. Results are shown in the following Table.

TABLE 4

Yields to Glucose and Xylose (Example 5).

| Time (minutes) | % Yield to Glucose | % Yield to Xylose |
|---|---|---|
| 15 | 11.4 | 18.1 |
| 30 | 24.7 | 38.2 |
| 45 | 39.6 | 51.4 |

TABLE 4-continued

Yields to Glucose and Xylose (Example 5).

| Time (minutes) | % Yield to Glucose | % Yield to Xylose |
|---|---|---|
| 60 | 54.9 | 61.8 |
| 90 | 71.9 | 68.4 |
| 120 | 87.6 | 77.0 |
| 180 | 94.8 | 79.1 |
| 240 | 98.6 | 80.6 |

Comparative Example A

The procedure of Example 3 was repeated, except that 0.5 g of milled corn cob (typically 1-2 mm in size) was used in place of the delignified corn cob. The milled corn cob was not pretreated to remove lignin. After 4 hours of reaction (15 minutes of decrystallization and 3.75 hours of hydrolysis) the glucose yield was 40-41% of theoretical. Results are given in the following Table.

As can be seen from a comparison of the results for Comparative Example A with those for the inventive Examples, omitting the delignifying pretreatment gave much lower glucose yields.

TABLE 6

Yields to Glucose and Xylose (Comparative Example A).

| Time (minutes) | % Yield to Glucose | % Yield to Xylose |
|---|---|---|
| 15 | 9.87 | 35.3 |
| 30 | 15.1 | 69.6 |
| 45 | 21.5 | 80.7 |
| 60 | 28.4 | 92.9 |
| 90 | 33.1 | 95.3 |
| 120 | 36.2 | 95.7 |
| 180 | 39.5 | 98.4 |
| 240 | 41.5 | 101.7 |

Comparative Example B

The procedure of Example 3 was repeated, except that the decrystallization step was omitted. 0.5 g of delignified corn cob (delignified using 8 weight percent sodium hydroxide based upon the weight of the corn cob, as in Example 2) and 13 g of 6 wt % sulfuric acid were combined and heated with stirring at 115° C. for 4 hours. Results are shown in the following Table.

As can be seen from a comparison of the results for Comparative Example B with those for the inventive Examples, omitting the decrystallization step gave much lower glucose yields.

TABLE 7

Yields to Glucose and Xylose (Comparative Example B).

| Time (minutes) | % Yield to Glucose | % Yield to Xylose |
|---|---|---|
| 30 | 0 | 46.3 |
| 60 | 0 | 60.3 |
| 150 | 4.4 | 76.7 |
| 180 | 4.8 | 82.9 |
| 240 | 5.6 | 86.8 |

Although particular embodiments of the present invention have been described in the foregoing description, it will be understood by those skilled in the art that the invention is capable of numerous modifications, substitutions, and rearrangements without departing from the spirit of essential attributes of the invention. Reference should be made to the appended claims, rather than to the foregoing specification, as indicating the scope of the invention.

What is claimed is:

1. A process to produce a sugar solution from polysaccharide enriched biomass, the process comprising:
   a) providing a biomass comprising lignin and having a glucan/xylan weight ratio $G_1/X_1$;
   b) contacting the biomass of (a) with water and at least one nucleophilic base, to form a biomass slurry having a pH of about 12.5 to about 13.0; and
   c) maintaining the biomass slurry under reaction conditions comprising a first temperature and first reaction time such that the slurry attains a pH of about 9.5 to about 10.0, wherein the slurry comprises a lignin-containing liquid fraction and a solid fraction comprising a polysaccharide enriched biomass wherein the biomass slurry has a glucan/xylan weight ratio $G_2/X_2$ within about 15% of the value of $G_1/X_1$;
   wherein $G_1$ and $G_2$ are grams of glucan per 100 grams of biomass and of biomass slurry respectively, and $X_1$ and $X_2$ are grams of xylan per 100 grams of biomass and biomass slurry respectively;
   d) contacting the polysaccharide enriched biomass solid fraction with an acid solution at a second temperature and for a second reaction time sufficient to produce a decrystallized biomass mixture, wherein the polysaccharides present in the polysaccharide enriched biomass solid fraction have been substantially decrystallized, and wherein the acid solution;
      i) comprises about 70 weight percent to about 100 weight percent sulfuric acid; or
      ii) comprises an acid mixture comprising phosphoric acid and sulfuric acid, wherein the molar ratio of phosphoric acid to sulfuric acid in the acid mixture is from about 3.39:1 to about 0.21:1;
   e) adding water to the decrystallized biomass mixture to produce a diluted biomass mixture, wherein the amount of water added is from about 20 weight percent to about 200 weight percent based on the weight of the decrystallized biomass mixture; and
   f) maintaining the diluted biomass mixture at a third temperature and for a third reaction time to produce a saccharification product comprising a sugar solution.

2. The process of claim 1, wherein the at least one nucleophilic base comprises a water soluble metal hydroxide, optionally in combination with a metal carbonate or an organic hydroxide.

3. The process of claim 2 wherein the water soluble metal hydroxide is selected from the group consisting of sodium hydroxide or potassium hydroxide and the metal carbonate or an organic hydroxide is selected from the group consisting of sodium carbonate, potassium carbonate ammonium hydroxides and alkyl substituted ammonium hydroxide.

4. The process of claim 1, wherein the first temperature is from about 20° C. to about 110° C.

5. The process of claim 1, wherein the first reaction time is from about 4 hours to about 30 days.

6. The process of claim 1, wherein the value of $G_2/X_2$ is within 10% of the value of $G_1/X_1$.

7. The process of claim 1, wherein at least about 70 percent of the lignin in the provided biomass is delignified in the polysaccharide enriched biomass solid fraction.

8. A process according to claim 1 wherein step (e) is performed one or more times.

9. The process of claim 1, wherein the second temperature is from about 0° C. to about 30° C. and the second reaction time is from about 0.1 hours to about 48 hours.

10. The process of claim 1, wherein the third temperature is from about 50° C. to about 100° C. and the third reaction time is from about 1 hour to about 8 hours.

11. The process of claim 1, wherein the acid solution comprises about 70 weight percent to about 100 weight percent sulfuric acid.

12. The process of claim 1, wherein the acid solution comprises the acid mixture comprising phosphoric and sulfuric acid, and the molar ratio of phosphoric acid to sulfuric acid in the acid mixture is from about 1.98:1 to about 0.36:1.

13. The process of claim 1, wherein the ratio of the weight of the polysaccharide enriched biomass solid fraction to the weight of the acid solution is from about 1:0.2 to about 1:5.

14. The process of claim 1, further comprising separating at least a portion of the sugars from the saccharification product.

* * * * *